Oct. 6, 1942.　　　　J. F. O'BRIEN　　　　2,297,796
CHIP CONTROL MECHANISM
Filed Sept. 13, 1941
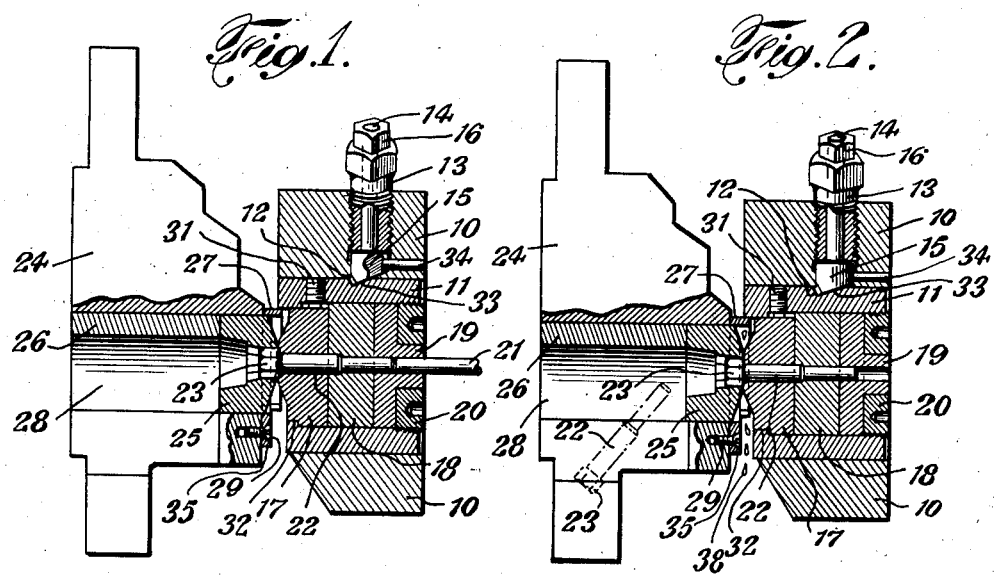
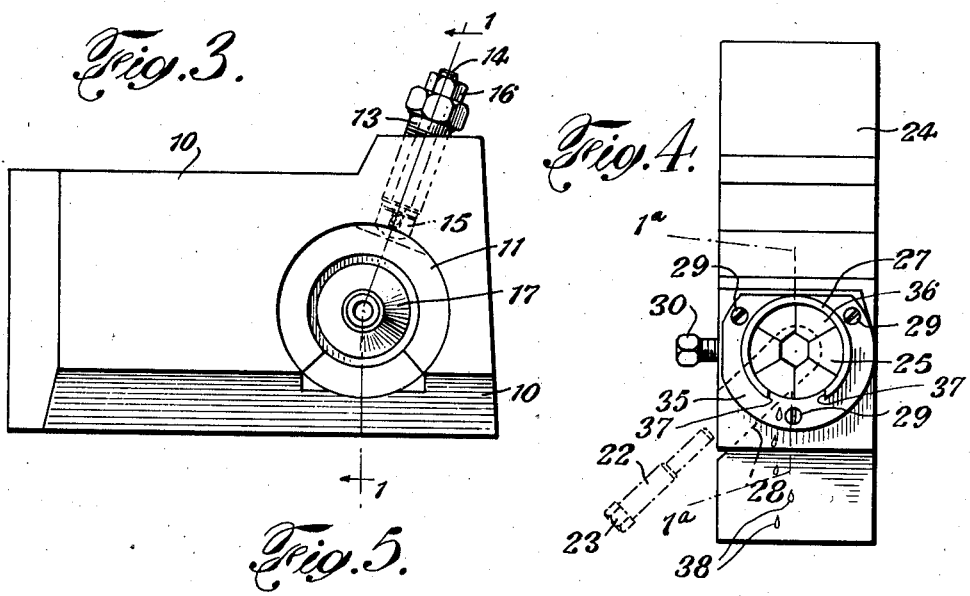
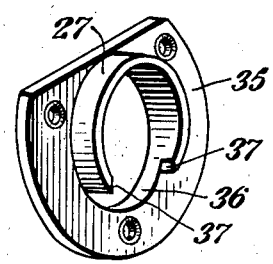
INVENTOR
John F. O'Brien
BY
ATTORNEY Patented Oct. 6, 1942

2,297,796

UNITED STATES PATENT OFFICE 2,297,796

CHIP CONTROL MECHANISM

John F. O'Brien, Waterbury, Conn., assignor to The Waterbury Farrel Foundry and Machine Company, Waterbury, Conn., a corporation of Connecticut Application September 13, 1941, Serial No. 410,749

5 Claims. (Cl. 10—20)

This invention relates to a new and useful chip control mechanism.

A principal object of this invention is to provide mechanism that will limit the flight of chips cut from a workpiece by cutting tools to a confined chamber open at one side toward which the chips are directed for escape into a stream of chips that accumulate in a positioned receptacle.

To these and other ends, this invention consists in the chip control mechanism having details of construction as will be hereinafter described.

Referring to the drawing, which illustrates a preferred embodiment of the invention, and wherein like numerals of reference indicate like parts in the several figures;

Figure 1 is a transverse sectional view of a die block and punch holder, as used in a header, upsetting machine or the like, the parts in the die block in section being taken generally upon line 1—1 of Figure 3; and of the punch holder upon line 1ª—1ª of Figure 4. In this figure the cutting tool is about to complete a cutting or trimming stroke;

Figure 2 is a view similar to Figure 1, with the parts shown in a different relative position, that is, after the completion of the cutting or trimming stroke;

Figure 3 is an elevation of the die block and associated parts;

Figure 4 is an elevation of the punch holder and associated parts; and

Figure 5 is a perspective view of one form of a chip control member.

As disclosed herein, this invention is applied to tools for trimming the head of a bolt, but it is adapted equally as well for trimming other objects, such as a nut or the like. With such tools, the trimming cut is usually made from the top toward the underside of the head, but it may be made from both ends or from the underside of the head to the top. At the completion of the cut the chips formed thereby break off with sufficient force to be projected with considerable force in several directions about the center of the trimmed article. The flight of these chips continues until the projecting force is exhausted or they strike some object. In trimming polygonal articles there is at least one chip for each trimmed face, and with six faces there are not less than six chips that fly off in paths substantially perpendicular to the cut face about the center of the article. These flying chips are liable to lodge in and about moving parts, causing serious trouble, and become a physical hazard to the operator. Being unrestrained in their flight, the chips accumulate in places where they are objectionable and require manual removal therefrom.

With the mechanism herein disclosed, the flight of the chips is limited and they are confined within a chamber, from which they escape through an outlet into a receptacle conveniently arranged to receive them. This result is accomplished without impairment of the function of the cutting or trimming tools, and without establishing an objectionable obstruction.

These, and other difficulties in the art, are overcome in this invention, wherein the tools are surrounded by a wall that moves with one of the tools, and when adjacent to its companion tool, forms a chamber around that area where the chips will fly when released. As shown, the mechanism is particularly associated with the trimming punch and movable therewith, but it may be applied and operated equally as well if associated with the trimming die, companion tool, or other adjacent part.

The numeral 10 designates a die block held in a fixed position in a trimmer or the like, and 24 designates a punch holder movable toward and away from the die block. Within the die block is a sleeve 11, in the bore of which is a trimming punch 17, having an opening therethrough substantially the same diameter as the shank of the bolt to be trimmed. In rear of the trimming punch is an extrusion die 18, backed up by a filler disk 19 having a projection extending through the opening in the nut 20, threaded into the sleeve 11. This nut holds the trimming punch 17, extrusion die 18 and filler disk 19 together as a unit within the sleeve 11, with the shoulder 32 on the trimming punch engaging a similar shoulder on the sleeve 11. A screw 31 threaded through the sleeve 11 impinges against the trimming punch 17 and holds the same against relative rotation.

Threaded into the die block is a hollow screw 13, through which projects the shank of a stud 14 having a nut 16 upon the outer end thereof, and the head 15 of which has a bevelled face 33, which projects into a recess 12, in the outer wall of the sleeve 11, having an inclined floor (Figs. 1 and 2).

The engagement of the bevelled face 33 with the inclined floor of the recess 12 provides a large area contact between the head 15 and sleeve 11. The stud 14 is held against rotation by a dowel pin 34 which projects into a recess in the head 15 thereof (Fig. 1).

Within the punch holder 24 is a trimming die 25, secured in position by a screw 30 or the like, which is backed up by a hollow block 26, the rear face of which is substantially flush with that of the punch holder 24. Both of these faces, in practice, are in contact with a rigid part, and in operation there is no endwise movement within the punch holder of either the trimming die or the block.

Through the trimming die is an orifice, the cross sectional shape and size of which is the same as the trimmed object, in this case, hexagonal, and the outer face of the trimming die recedes outwardly from the opening, the line of junction of the outer face and the opening forming the cutting edge of the tool, substantially as shown in Figures 1 and 2.

The mechanism above described constitutes no part of the present invention.

When the trimming punch 17 and the trimming die 25 are approaching and adjacent to each other there is an open annular space surrounding their opposing faces, into which the chips are projected and pass therethrough unrestrained in their flight.

One form of this new mechanism comprises a base portion 35, having an opening 36 therethrough, surrounded in part by a guard wall 27. Between the ends 37 of this guard wall is an open space, which is generally positioned below the workpiece. The base plate 35 is secured to the punch holder by screws 29, with the guard wall partly encircling the die 25 and the top wall beyond the face of the die. As the punch holder moves forward the guard wall 27 telescopes into the open end of the sleeve 11 and remains therein during the final portion of the cutting or trimming operation, and except at the lower side, closes the said annular space between the die and punch.

The chips 38, as they fly from the trimmed surface, strike the inner face of the guard wall 27, which limits their flight to such wall, and are then deflected downwardly thereby and escape through the open space between the ends 37 of the guard wall. After the trimming tools have performed their function and before the punch holder 24 is withdrawn with the chip mechanism, the bolt is ejected through the trimming die 25 by the knockout pin 21, as is usual, escaping through the opening 28 in the side of the block 26 and punch holder.

As shown, this chip control mechanism is associated with the punch holder, but it will function equally as well if secured to the face of the sleeve 11, or any other adjacent part.

It is contemplated to make the device of metal, but it may be made of rubber, or other material. If of rubber, it may be positioned so that one face thereof will engage an adjacent rigid face and be compressed slightly near the limit of the stroke of the punch holder 24.

Having thus described the invention, what is claimed, is:

1. In combination with tools which cooperate to cut one or more chips from a workpiece, having an open space surrounding the point of severance of the chip; a member which projects into said open space and forms an enclosed wall around a portion thereof at said point of severance, that portion of the space not enclosed being below the said point of severance.

2. A mechanism for trimming a workpiece by cutting one or more chips therefrom, which includes trimming members, the point of trimming being surrounded by an intercepting arcuate wall independent of and carried by one of the members and spaced from and about the point of trimming, the opposite ends of the wall being spaced from each other below the point of trimming and between which the chips escape from the open space by gravitational movement.

3. A mechanism for trimming a workpiece by cutting one or more chips therefrom, having trimming members with an open space therebetween, which includes chip intercepting means carried by one of the members and extending about the point of cutting and receivable in said space and having an outlet for the chips located below the point of trimming whereby to provide for gravitational movement of the chips through the outlet.

4. A trimming mechanism in accordance with claim 3, wherein one of the members has a reentrant portion and wherein the chip intercepting means is carried by the other member and is receivable in said reentrant portion and has an outlet in communication with the latter and located below the point of cutting to provide for gravitational movement of the chips therethrough.

5. A trimming mechanism in accordance with claim 3, wherein one of the members has a reentrant portion and wherein the chip intercepting means is composed of an element having an upper part overlying the point of cutting and said upper part having depending sides disposed on opposite sides of the point of cutting and having lower ends spaced to form an outlet, said outlet being located below the point of cutting to provide for gravitational movement of the chips therethrough.

JOHN F. O'BRIEN.